Oct. 31, 1961 R. C. MINNICK ET AL 3,007,140

STORAGE APPARATUS

Filed July 8, 1960 5 Sheets-Sheet 1

INVENTORS.
ROBERT C. MINNICK
EDWIN S. LEE, III
BY Christie, Parker & Hale
ATTORNEYS.

INVENTORS.
ROBERT C. MINNICK
EDWIN S. LEE, III

BY Christie, Parker & Hale

ATTORNEYS.

INVENTORS.
ROBERT C. MINNICK
EDWIN S. LEE, III
BY Christie, Parker & Hale
ATTORNEYS.

Oct. 31, 1961 R. C. MINNICK ET AL 3,007,140

STORAGE APPARATUS

Filed July 8, 1960 5 Sheets-Sheet 4

INVENTORS.
ROBERT C. MINNICK
EDWIN S. LEE, III
BY
Christie, Parker & Hale
ATTORNEYS.

INVENTORS.
ROBERT C. MINNICK
BY EDWIN S. LEE, III
Christie, Parker & Hale
ATTORNEYS.

United States Patent Office 3,007,140

Patented Oct. 31, 1961

3,007,140

STORAGE APPARATUS

Robert C. Minnick, Menlo Park, and Edwin S. Lee III, San Gabriel, Calif., assignors to Burroughs Corporation, Detroit, Mich., a corporation of Michigan Filed July 8, 1960, Ser. No. 41,550

16 Claims. (Cl. 340—174)

This invention relates to storage apparatus and more particularly to a method and apparatus for reading and writing information into a memory. In one of its specific embodiments the invention is directed to a magnetic control switch for a dynamic storage device.

One well-known form of the dynamic storage device is an acoustic delay line storage system arranged with a recirculating loop. The signals are stored in an acoustic delay line by coupling the signals to the delay line and propagating them within the delay line as acoustic disturbances and detecting the acoustic disturbances at some preselected later interval and reconverting them into electrical signals. These signals may be stored in the delay line system by continually recirculating them from the output transducer back to the input transducer for the acoustic delay line. Recirculating delay line systems have employed conventional switching circuits such as flip-flop circuits for reading, writing, and erasing information into and out of the train of circulating pulses. A system of this type is described in the text entitled "High Speed Computing Devices," by the Engineering Research Associates, on pages 341–348, published by McGraw-Hill Book Company, Inc., in 1950. The use of conventional electronic techniques including reading and writing gating circuits requires that the circuits be provided with sufficient power to hold them in their selected state to effect the desired reading or writing operation. Similar operations may be performed at slower speeds by utilizing relay techniques.

The present invention provides a magnetic control arrangement for reading and writing information into and out of a recirculating delay line at relatively high speeds. The reading and writing operations possible with the present invention may be performed at high speeds without the need to provide holding power to maintain the switching elements effecting these operations in a preselected state. To this end the invention advantageously utilizes the static characteristic of magnetic cores. Accordingly the invention provides a switching arrangement capable of use in a recirculating delay line system which is capable of operating at high speeds and less expensive than comparable devices operating at these speeds. The invention also allows a high degree of controlled flexibility when it is incorporated into a computer system.

The invention is best described as it is incorporated in a digital computer including a dynamic storage device having spaced apart input and output transducers interconnected in a loop to continually recirculate information in the form of a train of pulses received at the output transducer and delivered to the input transducer for re-entry into the dynamic storage device. The switching means for reading information out of and writing information into the recirculating train of pulses takes the form of multi-aperture magnetic cores having a substantially rectangular hysteresis characteristic. The recirculating loop includes at least a single multi-aperture magnetic core for writing in information and at least a single multi-aperture magnetic core for reading out the recirculating train of pulses. When the reading and writing cores are placed in a blocked or non-read or non-write magnetic condition, the train of pulses are continuously recirculated from the output transducer to the input transducer in a normal and unmodified fashion without effecting the reading and writing sources and vice versa.

In one specific embodiment the dynamic storage device is in the form of a magnetostrictive delay line whereby the propagating acoustic pulses are converted to voltage pulses at the output transducer. The voltage pulses are coupled through the writing cores but since the magnetic cores are current sensitive the voltage pulses are ineffective to produce any output indication. In order to read information from the recirculating delay line or write information into the recirculating loop, the corresponding read and write cores must be placed in the unblocked or read or write magnetic state. When the writing core is placed in an unblocked magnetic state the writing core is arranged to develop an output signal corresponding to the binary value of the signal to be read into the recirculating train of pulses. These signals are combined with the recirculating signals in a fashion to cause the selective triggering of a current pulse generator to write in a new binary value and erase the recirculating pulse. The combined signals are effective at the means for converting the voltage pulses to current pulses to properly introduce the desired binary values into the input transducer. When a plurality of writing cores are employed, binary information from a plurality of sources may be selectively combined with the recirculating train of pulses for said train.

The binary coded current signals derived from the current generator are effective on the read cores only when they are in the unblocked state. The recirculating train of current pulses will then be effective to switch the magnetic state of a core to provide a readout signal. A plurality of read cores may be arranged in this fashion to cause the recirculating train of pulses to be read in a parallel fashion to a plurality of receivers or registers for use in the computer proper.

These and other features of the present invention may be more fully appreciated when considered in the light of the following specification and drawings, in which.

Figure 1:
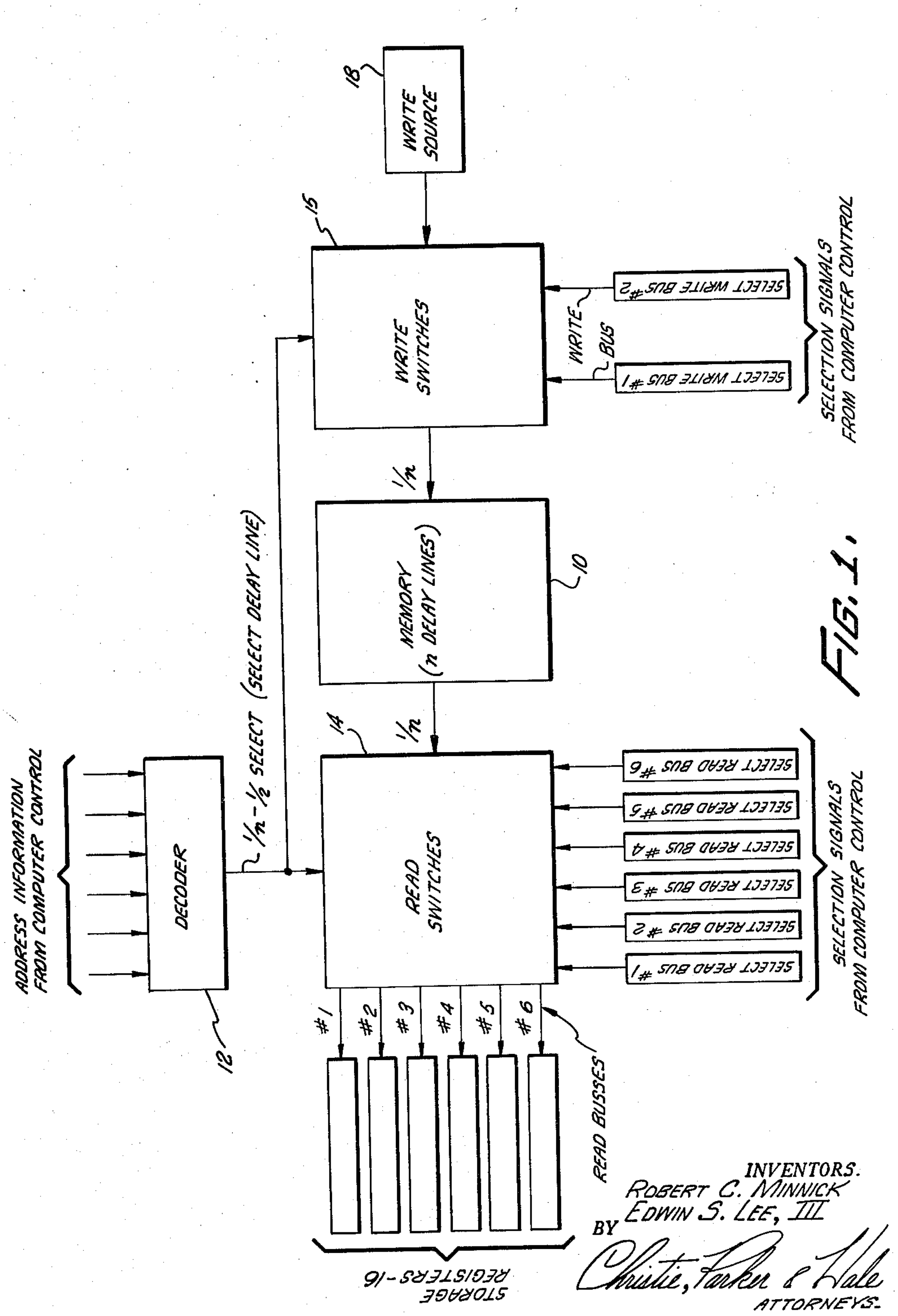
FIG. 1 is a schematic representation of a typical memory system embodying the invention.

Now referring to FIG. 1, the general organization of the memory system will be described. The storage of information is by means of the memory device 10, illustrated in block form, and which memory device comprises a plurality of recirculating delay lines; for example 64 delay lines. The information stored in a particular delay line of memory 10 is identifiable by means of an address functioning to locate and elect the delay line storing the desired information. The address information is derived from the computer control along with the information indicating a read or write operation whereby any delay line will be connected to a read or write switch. The stored information comprises words and with each word having an identification signal or tag. The computer further including facilities for comparing the desired tag with the tags of the words in any selected delay line.

The address information received from the computer is directly applied to a decoding network 12 for energizing one of its plurality of output lines in accordance with the received address information to thereby select one of the delay lines for a read or write operation. The decoder output signal is applied to the read and write switches 14 and 15 respectively coincidentally with the application of a control signal selecting a desired read or write bus to correspondingly read or write information out of or into a particular delay line to one of the storage registers 16 or from a writing source corresponding to the selected write bus. The new information to be written into the memory 10 is delivered to the write switches 15 from the writing source shown in block form and identified by the reference character 18.

Figure 2:
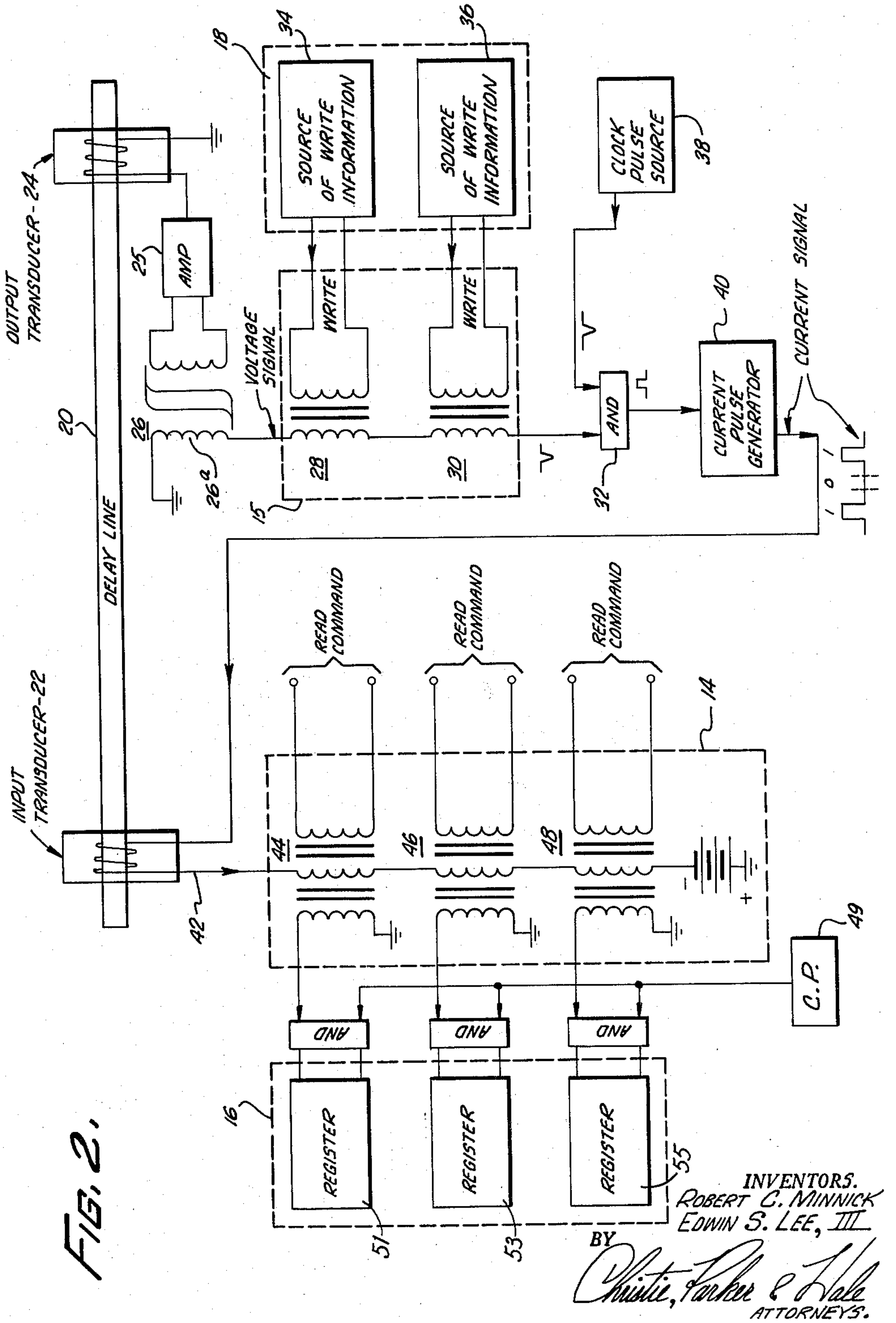
FIG. 2 is a schematic representation of a delay line system diagrammatically illustrating the reading and writing apparatus in accordance with the present invention.

Prior to describing the control arrangement in accordance with the system of FIG. 1, the magnetic control switch of the invention as applied to a single recirculating delay line 20 illustrated in FIG. 2 will be examined. The delay line 20 may be in the form of a magnetostrictive delay line to store the information pulses as acoustic disturbances traveling in the line. To this end the delay line 20 is provided with an input transducer 22 spaced adjacent one end section of the delay line 20 and which input transducer initiates the acoustic disturbances in the delay line upon excitation of its transducer. The input transducer 22 may take the form of an electrical coil magnetically coupled to the delay line, in a well-known manner, to produce the acoustic disturbances. Spaced a preselected distance from the input transducer 22 there is provided an output transducer 24. The distance between the transducers 22 and 24 determine the storage time of the information in the memory system and may be controlled by varying the distance between the transducers 22 and 24 in accordance with the particular application. The output transducer 24 may also be in the form of a coil magnetically coupled to the delay line whereby the acoustical disturbances passing through the coil will produce a flux change therein whereby an electrical voltage signal will be generated at the output transducer 24. This signal may be amplified and shaped by a conventional amplifier 25 to produce a usable signal of the correct waveform.

The amplified signal from the device 25 is then applied to an input transformer 26 having a magnetic core of substantially square hysteresis characteristic. Accordingly, the information signals derived from the delay line 20 will appear at the secondary winding 26A of transformer 26 in terms of binary coded signals. These signals will be voltage signals of low current value whereby a binary one will be represented by a negative voltage signal, while a binary zero value will be at substantially ground level. The information signals appearing at the secondary winding 26A are serially connected with a pair of write switches 28 and 30, shown as transformers, and by means of these switches coupled to an AND circuit 32. Each of the write switches 28 and 30 are coupled to separate sources of information, shown as the blocks 34 and 36, and effective by means of their primary windings of the transformers 28 and 30 to write new information into the train of voltage pulses passing therethrough and simultaneously erasing the information derived from the delay line 20.

It should also be noted that when the switches 28 and 30 are in a non-write position the voltage signals in the secondary winding 26A appear at the AND circuit 32 as derived from the delay line without modification. The voltage information signals appearing at AND circuit 32 are combined with a negative voltage clock pulse signal occurring at a preselected repetition rate and derived from the clock pulse source 38. The coincidental application of a negative voltage pulse from the clock pulse source 38 and a negative voltage signal, representing the binary value one, from the delay line 20 will produce an output signal from the AND circuit 32 effective to trigger a current pulse generator 40. The current pulse generator 40 is utilized to convert the voltage signal derived from the delay line 20 to a current signal. The current signal appearing at the output from the current pulse generator 40 is binary coded whereby a positive current signal represents the binary value one, while no signal, or a signal at ground level, represents the binary value zero. At this point it should be recalled that the magnetic control switches 28 and 30 are current-sensitive devices whereby when they are in the non-write state the voltage signals applied thereto from the transformer secondary 26A have no effect on the state of the switches 28 and 30 and, as mentioned hereinabove, the non-write state of these switches have no effect on the pulse train. The train of current signals from the current pulse generator 40 is then applied to the input transducer 22 to close the recirculation loop. The pulses are re-entered into the delay line 20 by means of the input transducer 22 and continually recirculated in this fashion.

The lead wire 42 connected to the opposite terminal of the input transducer 22 from the current pulse generator 40 and therefore has appearing thereon the train of current signals delivered to the input transducer 22. The lead wire 42 is arranged in series circuit relationship with read control switches, in this instance shown as the three magnetic read control switches 44, 46, and 48, and terminates at a source of negative potential shown as a battery. The read switches 44, 46, and 48 are substantially similar to the write switches 28 and 30. The read switches have a read and a non-read position whereby when they are in the non-read position the signals are not read out and no information is transferred to the individual receivers or registers comprising the storage register 16. The application of the information to the registers 51, 53, and 55 is under the control of individual AND circuits utilized in combination with a clock pulse source 49.

With the structure of FIG. 2 in mind, it will be seen that the information applied to the input transducer 22 emerges from the output transducer 24 and is continually recirculated between these transducers and through the delay line 20 when the writing switches 15 are in a non-read position. When any write switch, such as switches 28 or 30 comprising the switches 15, are placed in a writing condition, the combination of the signals appearing at the AND circuit 32 control whether the current pulse generator 40 is actuated or triggered to produce a current output signal representing the desired signal written into the train of pulses derived from the output transducer 24. This new train of pulses will then be applied to the input transducer 22 and will be continually recirculated in this fashion unless new signals are to be written into the train. At the same time that the write switches 15 are in a writing position or at a subsequent time, any one of the read switches 44–48 comprising the switches 14 may be placed in a read condition to read out the information then present in the recirculation loop. By placing more than one of these read switches in the read condition, the recirculating information may be delivered to different registers comprising the storage register 16 at the same time. Since the signals appearing on the lead wire 42 delivered to each of the read switches are current signals, it will be appreciated that the read switches must be adapted to be non-responsive to these signals when it is not desired to read them out. Also, the switches must be controllable to place them in the desired reading condition to allow them to respond to the current pulses when they are applied thereto to effect the reading operation.

Figure 3:
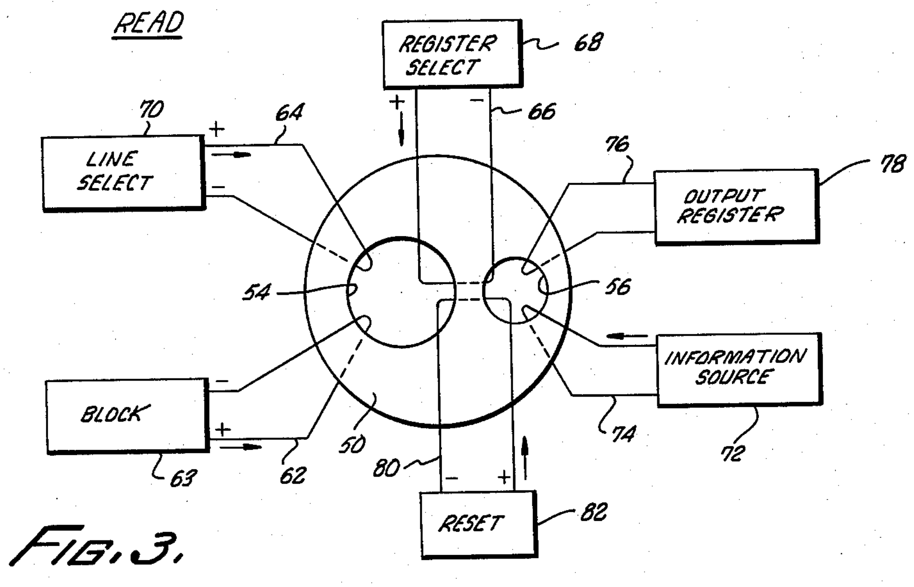
FIG. 3 is a schematic representation of the reading core for a delay line system of the type of FIG. 2.
Figure 4:
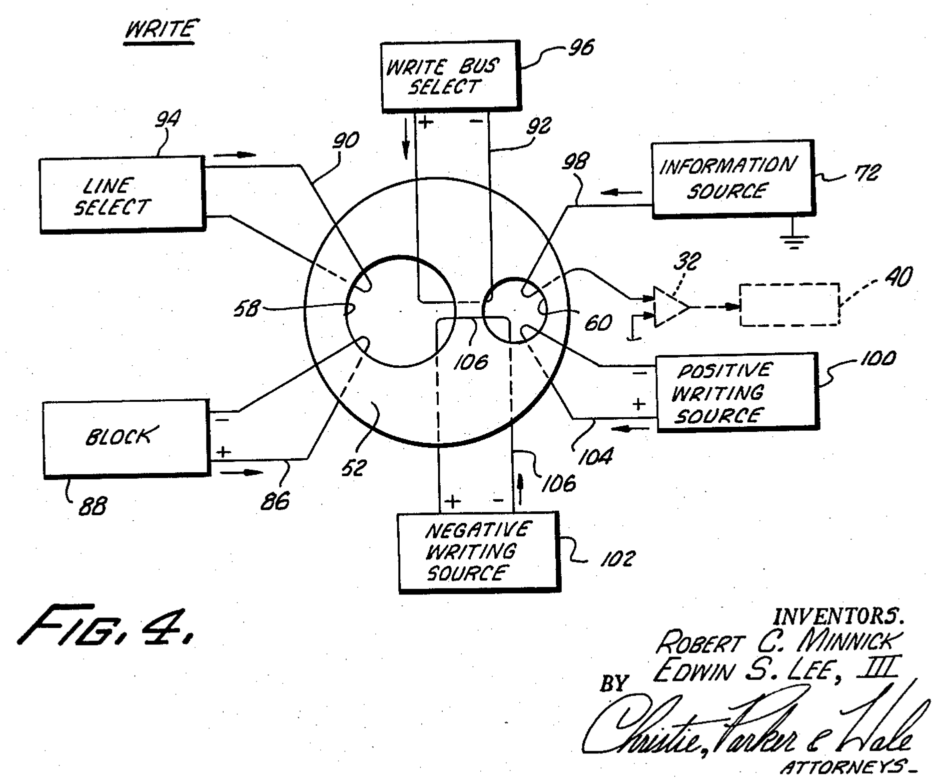
FIG. 4 is a schematic representation of the writing core for a delay line system of the type of FIG. 2.

With the above general organization of the recirculating delay line 20 in mind, a detailed examination of the individual read and write switches with reference to FIGS 3 and 4 is necessary. The individual read and write switches are illustrated and will be described as used for reading and writing into a plurality of delay lines rather than a single delay line as illustrated in FIG. 2. The individual read and write switches for the purposes of this invention take the form of multi-apertured magnetic cores, having a substantially rectangular hysteresis characteristic, of the type described in the article by J. A. Rajchman and A. W. Lo appearing in the Proceedings of the Institute of Radio Engineers for March 1956 on pages 321–332 and entitled "The Transfluxor." It will be appreciated from this Rajchman-Lo article that the multi-aperture cores have two magnetic conditions identified as the blocked and unblocked states and which states can be considered to correspond to the non-read or the non-write and the read and the write states respectively of this invention.

The blocked state establishes a pair of flux paths in the magnetic cores 50 and 52 around the relatively large aperture 54 and the relatively small aperture 56 for the magnetic core 50 to define the first, second, and third legs in the core 50. The first leg as applied to a read switch is defined as the area between the left-hand extremity of the core 50 and the periphery of the large aperture 54. The second leg is defined as the area between the apertures 54 and 56 while the third leg is the area between the right-hand extremity of the core 50 and the right-hand periphery of the aperture 56. The pair of flux paths under consideration is the path looping legs one and three and the flux looping legs one and two around the aperture 54. The blocked magnetic state is defined whereby the pair of flux paths travel in a counter-clockwise relationship in each of the legs one, two, and three. The unblocked magnetic state occurs when the direction of the flux around the large aperture 54 is reversed from its blocked state, that is, the flux in this path travels in a clockwise direction. This latter magnetic condition causes the flux in leg two to travel clockwise. It will be recognized that when the magnetic core 50 is in a blocked state the magnetic switch is essentially inoperative to read or transmit a signal applied thereto. The magnetic core 50 will read or transmit a signal applied thereto only when it has been previously set into the unblocked read state.

The general considerations with respect to these magnetic states and flux paths in the magnetic core 50 are equally valid for the write core 52. The larger aperture for the magnetic core 52 is identified by the reference character 58, while the smaller aperture is defined by the reference character 60. It will be recognized from the above-referenced article on the Transfluxor that the magnetic core may be placed in the blocked or unblocked state by means of a single winding coupled to control the flux in leg one. For the purposes of this invention, the function of setting the magnetic cores 50 and 52 in the blocked and unblocked states are produced by separate windings coupled to control the flux in leg one as will be described immediately hereinafter.

The read magnetic core 50 is placed in the blocked, or non-read, state by means of a winding 62 coupled to leg one through the larger aperture 54 and connected to be energized from a blocking source 63. The blocking source 63 is selectively energized to provide a current of sufficient amplitude to cause the flux in legs one, two, and three in the core 50 to traverse counter-clockwise paths. The unblocked or read condition of the magnetic core 50 is effected by simultaneously energizing a winding 64 and 66. The winding 64 is coupled to leg one by means of the aperture 54 and is connected to an energizing source 70, identified as a line select source. The winding 66 is coupled through the large aperture 54, and passes therefrom through the smaller aperture 56 back to the energizing source identified by the reference character 68 and by the register select source. The currents provided by the sources 68 and 70 are proportioned to cause the magnetic flux traveling in legs one and two around the large aperture 54 to reverse its direction, while leaving the flux traveling in the legs one and three to travel in a counter-clockwise sense. A necessary condition of the magnetic core 50, as well as the magnetic core 52, is that the first leg is defined to allow a larger number of flux lines to pass therethrough than the sum of the flux lines passing in the second and third legs.

When the magnetic core 50 is in an unblocked state an output signal may be transmitted therefrom by causing the flux in leg three to change by reversing the direction of the flux around the smaller aperture 56. To this end, the signal from an information source 72 is coupled to a winding 74, and which winding 74 is looped through the smaller aperture 56 to control the direction of the flux in leg three. It should be recognized that the information source 72 corresponds to the information received in the form of current signals or no signals derived from the current pulse generator 40 of FIG. 2. Accordingly, only the reception of a binary one from the source 72 is effective to produce a flux change in leg three. The flux change in leg three is detected by a winding 76 coupled thereto by means of the smaller aperture 56 and connected to a receiver or output register 78.

Although the information may be read out from the information source 72 or the delay line 20 upon its application to the magnetic core 50 as described immediately hereinabove, it has not been found to be convenient to read out this information at this time from a systems standpoint, that is, when a plurality of delay lines or information sources are utilized. To this end, a reset winding 80 is provided for the magnetic core 50 and which winding is coupled to a reset source 82. The reset winding 80 is coupled from the negative terminal of the source 82 to the larger aperture 54, from the front side as shown, and then laced from the opposite side of the magnetic core 50, through the smaller aperture 56 and back to the positive terminal of the source 82. The portion of the winding 80 effective on leg one is defined to oppose the flux provided by the energization of the winding 64. The current provided from the source 82, however, is proportioned whereby the flux change merely consists of a change in flux around the smaller aperture 56 in a direction opposite to that when a binary one is delivered from the information source 72. The signal generated in the winding 76 is then utilized as the signal applied to the output register 78 and which output signal is controlled by a gating network interposed between the winding 76 and register 78 under the control of a clock pulse source of the type shown in FIG. 2.

It will be recognized that the combination of the windings 64 and 66 provide the total current for selecting a magnetic switch for placing it in a read or an unblocked state. However, the amplitude of the currents provided by the sources 68 and 70 are such that separately they will not change the state of any core 50 through which it passes and thereby ineffective to read information from an undesired delay line. As will become evident hereinafter, some of the read cores 50 will have this half-select potential applied thereto whereby the half-select magnetomotive force is opposed by that portion of the winding 80 coupled to the larger aperture 54 and thereby prevents the spurious unblocking of the half-select cores. The energization of the reset winding 80 is controlled to prevent its simultaneous energization with the select winding 66. Reading out of the information signals by means of the reset winding 80 in this fashion also prepares the magnetic switch 50 to receive the next signal and causes each of the read-out signals to be of the same polarity.

The operation of the write core 52 of FIG. 4 is substantially similar to that of the read core 50. The blocking and unblocking operations are controlled in the same fashion in both the cores 50 and 52. The blocking of the write magnetic core 52 is effected by means of the winding 86 connected to a blocking source 88. The unblocking of the magnetic core 52 is effected by the half-select windings 90 and 92 respectively connected to their energizing sources 94 and 96. The information source 72 corresponding to the information derived from the delay line 20 is coupled to the third leg of the core 52 by means of the winding 98 passed through the smaller aperture 60. The signals provided by the information source 72 or delay line are voltage signals, and, since the magnetic core 52 is current sensitive, these signals will have no effect upon the state of the write magnetic core 52. A pair of writing sources, identified as the positive writing source 100 and the negative writing source 102, are also coupled to the magnetic core 52 by appropriate windings 104 and 106. The positive writing winding 104 is coupled to control the direction of the flux in leg three by being looped through the smaller hole 60. The current provided by the source 100 to the winding 104 produces a flux change in leg three whereby a positive voltage signal is induced in the winding 98. The negative writing source 102 is passed through the larger aperture 58 and the smaller aperture 60 as shown, and provides a flux change in leg three to produce a negative voltage signal in the winding 98.

The signals induced in the winding 98, that is, the signal induced by either the positive source 100 or the negative source 102, are combined with the signals provided by the source 72 and, as shown in FIG. 2, arrive at the common input for the AND circuit 32. In order to write information by means of the magnetic core 52 into the train of pulses provided by the information source 72, the sources 100 and 102 operate as a pair. To write a binary one into the train of pulses when the magnetic core 52 is unblocked, the positive writing source 100 is first applied, followed by the application of the negative writing source 102. The resulting information signal is read out by means of a clock pulse during a time interval coincident with the excitation of the negative writing source 102. To write a binary zero by means of the magnetic core 52 into the recirculating train of pulses, the negative writing source 102 is first applied and then the positive source 100 is applied to the corresponding winding of the write core. For this latter writing operation, the output signal on the winding 98 is read during the interval coincident with the application of the positive writing source 100. The first pulse applied to the magnetic core 52 when writing either a binary one or zero serves to guarantee that the magnetic flux around the small aperture 60 will be switching at the time of the application of the second pulse.

As mentioned hereinabove, it is necessary that a negative signal from both the clock pulse source 38 and the train of recirculating pulses occur simultaneously to produce a triggering signal for the current pulse generator 40. When a binary one is written into the pulse train by means of the magnetic switch 52, a negative voltage signal is combined with the pulse train. This negative signal in combination with a clock pulse signal will be sufficient to activate the AND circuit 32 when the recirculating signal is a binary zero as well as when it is a binary one since the latter combination of binary ones merely produces a negative signal of increased magnitude. When a binary zero is written in by means of the write core 52, a positive pulse is generated on the winding 98 and, when this is combined with a binary one or negative signal from the information source or delay line, the two signals are proportioned to essentially cancel out one another whereby a signal of substantially ground level corresponding to a binary zero is delivered to the AND circuit 32. This condition, then, will not produce a triggering signal at the current pulse generator 40. When the positive signal provided by the write core 52, to write in a binary zero, is combined with a binary zero (ground potential) from the delay line, it will be evident that the resulting positive signal will also not activate the AND circuit 32 to trigger the current generator 40. Essentially then, the writing in of information is effected by selectively unblocking the write magnetic core 52 and simultaneously writing in new information and erasing the existing information. While the write core 52 is blocked the existing information will be unaffected and will not affect the state of the core 52.

In summary then, if a negative signal appears at the AND circuit 32, a signal representing the binary value one will be placed into the memory 10, while if a positive signal is delivered thereto a binary zero will be placed into the memory. If no output is provided by the write magnetic core 25, the information already in the memory will be recirculated without any change in the information in the memory 10.

Figure 5:
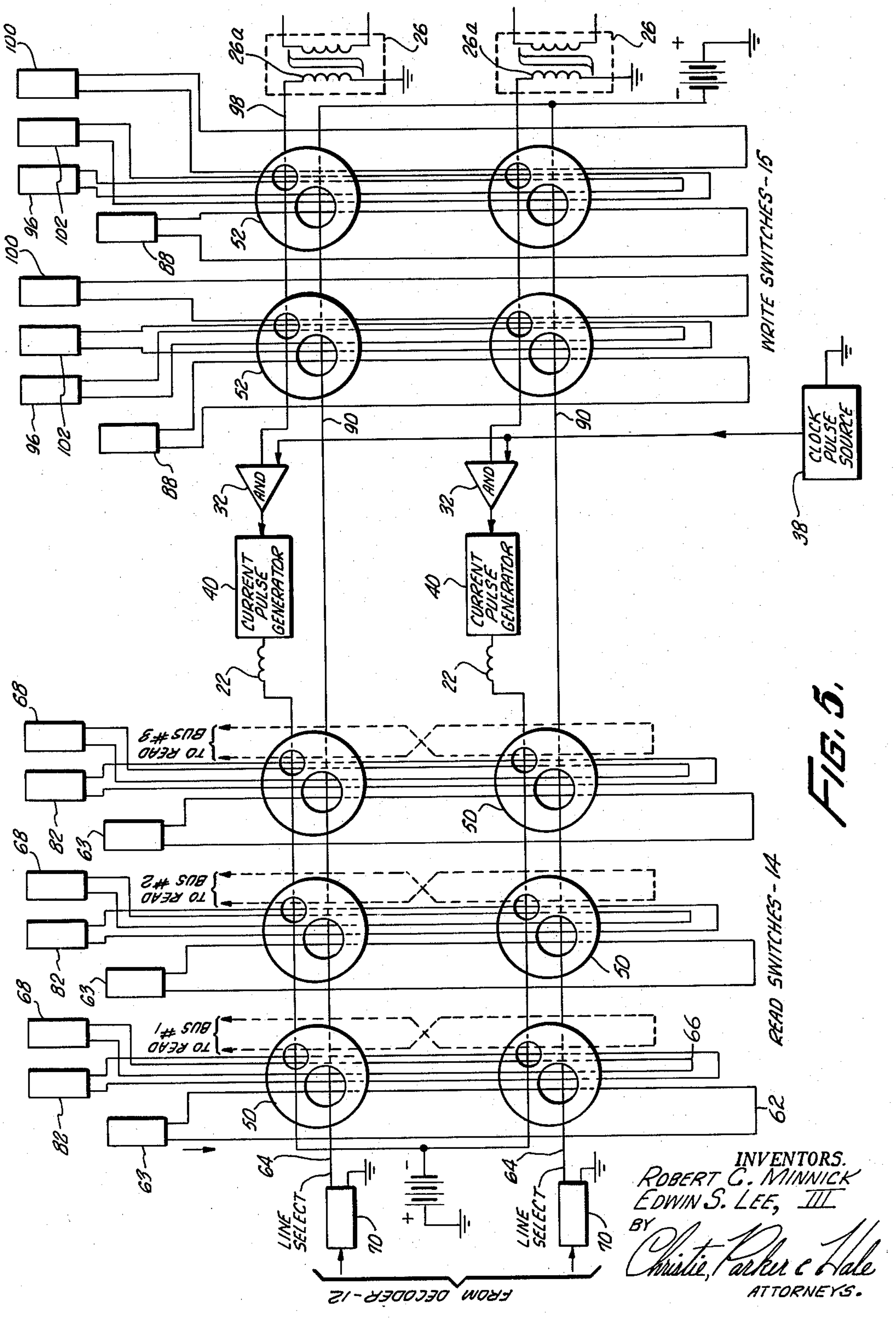
FIG. 5 is a partial, schematic representation of a delay line system of the type shown in FIG. 2 for selectively reading and writing information into a plurality of delay lines.
Figure 6:
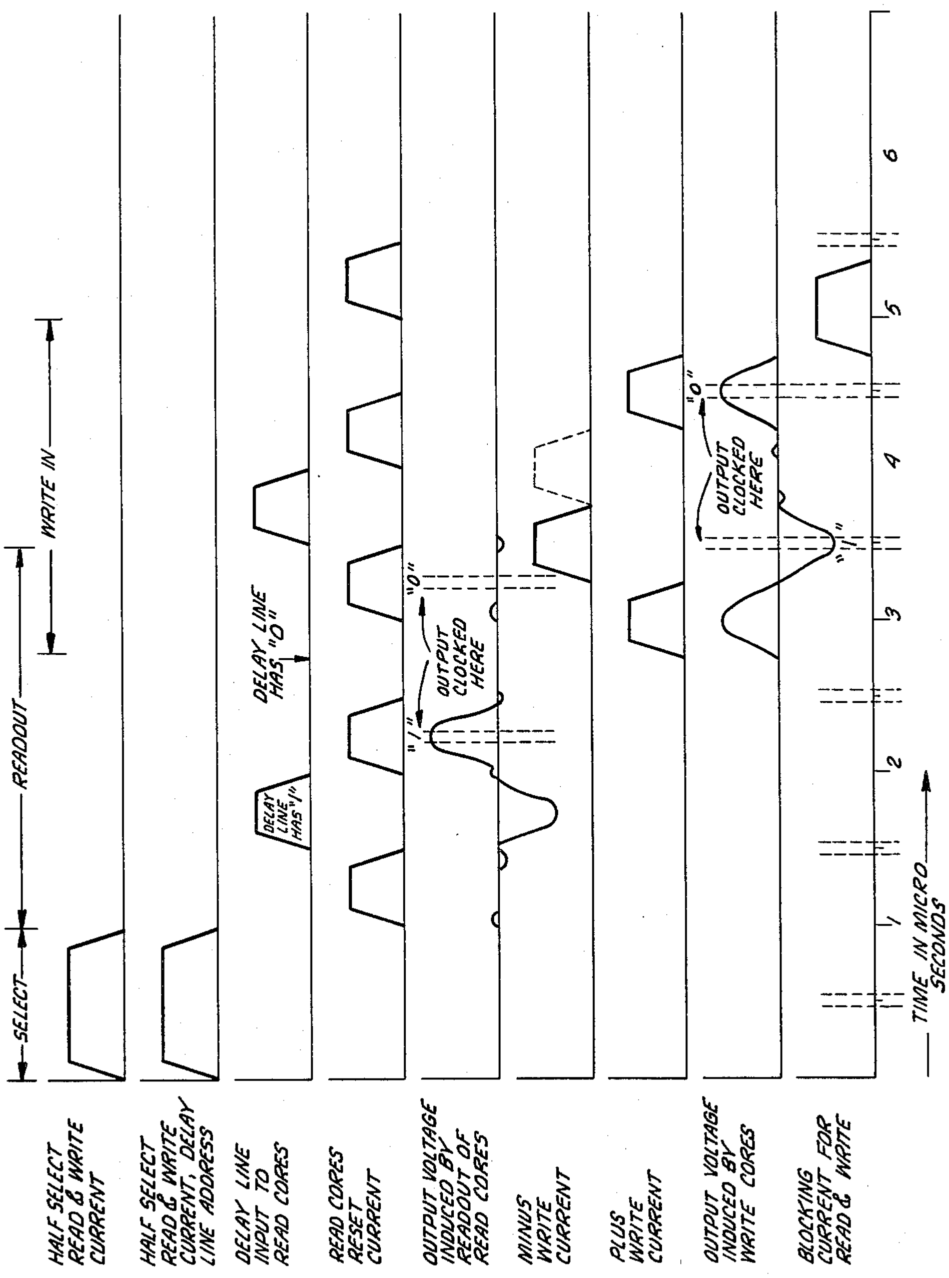
FIG. 6 is a timing diagram for the system of FIG. 5.

Now referring to FIG. 5, a system incorporating the read and write control switches as utilized for a plurality of recirculating delay lines will be described with the aid of the waveforms of FIG. 6. In an actual operating system more than two delay lines are employed, however, only two delay lines are shown in FIG. 5 merely to simplify the illustration and description of the invention. It should be recognized that any number of delay lines and any number of read and write switches may be utilized for any one delay line in accordance with this invention. Two magnetic write control switches are illustrated for every delay line while three read control switches are shown. Each of the read control switches are wound as shown for the magnetic core 50 of FIG. 3 and like reference numerals refer to the same elements. The line select winding is passed through each magnetic reading and writing core in a series circuit relationship whereby each read and write core arranged on the same selected horizontal line will be half selected when the corresponding line select sources are energized. The energization of one of the line select sources will be effected by the unique output signal from the decoder 12 which operates to select one of the $n$ lines where $n$ is the total number of delay lines or, in this instance, one out of two delay lines. The line select source energized from the decoder 12 is applied to energize the windings 64 and 90 for the read and write switches respectively, since the output from the decoder 12 is coupled thereto in a parallel circuit relationship as shown in FIG. 1. In order to read the information from the selected delay line into the desired output register similar to the register 78, it will now be recognized that the register select source 68 must be energized substantially simultaneously with the application of the half-select current from the decoder 12 to place the read switches in a read state. A register select source 68 is coupled to each of the read cores 50 in the same column or vertical alignment by means of the winding 66. Each magnetic core 50 in each column is arranged with the same winding configuration and in series circuit relationship as shown in FIG. 5. Upon the simultaneous excitation of the line select source 70 and the register select source 68, at least one of the read cores will be placed in the unblocked read magnetic state whereby the recirculating information from the selected delay line will be read to the selected one or more of the output registers 16 by means of the read busses one, two, or three corresponding to the delivery of information to the output register 78 from the output winding 76 as described in conjunction with FIG. 3. The same arrangement for the write control switches corresponding to the write control cores 52 of FIG. 4, that is, each of the windings shown for the magnetic core 52 are arranged in a horizontal and vertical series circuit relationship as described for the read switches. The information source 72 provides the input information which, in this instance, is the recirculating train of voltage pulses derived from the appropriate delay line 20 by means of the output transducer 24. The input source of information is merely represented by the transformer 26 for each delay line with the secondary winding 26A thereof connected to the read cores by means of the winding 98. The sources of input information shown as the blocks 34 and 36 of FIG. 2 correspond to the write source 18 of FIG. 1 and which sources each comprise a positive writing source 100 and a negative writing source 102 respectively connected to the windings 104 and 106 for each core.

It will be appreciated that the delay line input transducer 22 for each of the delay lines shown in FIG. 5 correspond to the input transducers for the delay line 20 and that the transformer 26 is responsive to the output signals derived from the output transducer 24 and amplifier-shaper 25 for the corresponding delay line 20. The interconnection of the input and output transducers in a recirculating loop and the delay line are omitted in FIG. 5 to simplify the description of the magnetic control read and write switches. Accordingly, it will be appreciated that with each read and write switch for each delay line in the blocked state that the information will continually recirculate from input to output transducer through the delay line.

With the above structure in mind, the operation of the read switches for the system of FIG. 5 will now be described in more detail. Assuming it is desired to read information into an output register 16 by means of the read bus number one from the delay line number one, the topmost delay line, it will be necessary to place the magnetic core 50 having the horizontal and vertical coordinates 1—1 in the unblocked state. The coordinates 1—1 correspond to delay line one, read bus one. This is effected by applying the correct address information from the computer to the decoder 12 whereby the line select source 70 for the horizontal select winding 64 having the coordinate "1" will be energized at the same time that the register select source 68 corresponding to the read bus number one is actuated. This will place all the magnetic read cores 50 having the horizontal coordinate one in the half-select condition and place all the magnetic read cores 50 having the vertical coordinate one in the half-select position, while only the core 50 having the horizontal-vertical coordinates 1—1 will be fully selected and placed in the unblocked read state. With this magnetic state prevailing in the read switches, the information pulses applied to the input transducer 22 will be coupled to each of the magnetic cores 50 having the horizontal coordinate one. The read buses number two and number three will not be provided with an output signal corresponding to the pulse train passing therethrough since their respective magnetic switches are still in the blocked condition. However, the arrival of the pulse train at the magnetic core 50 having the coordinates 1—1 will switch the flux in leg three of this core 50 and provide an output signal on the winding 76 for delivery to the read bus number one and the corresponding register. It should also be noted that no output signal will be provided by the information from delay line number two onto read bus number one, since the magnetic core 50 having the coordinates 2—1 was only half-selected and is therefore still blocked.

When a signal corresponding to the binary value one is applied to an unblocked core, a negative voltage signal will be generated in the output winding 76 therefor. The output signal provided by this flux excursion is similar to the signal shown in the timing chart of FIG. 6. As was described hereinabove, this output signal on the winding 76 is not applied to the output registers 16 at this time and the application of the signals on the winding 76 are controlled by a gating circuit activated by a clock pulse signal. As will be appreciated from studying the timing chart of FIG. 6, immediately following the application of one of the recirculating signals, the reset source 82 is energized to switch the flux around the smaller aperture 56 of the cores 50 to again provide an output signal in the winding 76. If the binary value one has been delivered to the magnetic core, a positive output voltage as shown in the timing chart will be subsequently produced by the energization of the reset winding. This positive output signal will be combined with the clock pulse signal occurring during the duration of the output signal on the winding 76 whereby this coincidental application of signals will cause the binary value one to be recorded in the output register 16 tied to the read bus number one. This reset signal will also prepare the magnetic core 50 for the subsequent arrival of the successive recirculating pulse and which pulse will occur substantially simultaneously with the termination of the reset current. In the same fashion, the arrival of a binary zero from the delay line will produce substantially no output signal from the read core and a binary zero will be read out to the read bus.

The reset current from the source 82 is controlled as mentioned hereinabove and readily evident from FIG. 6 whereby it is never energized while the register select source 68 is energized and, accordingly, the current provided by the source 82 may be as high as practical since it cannot unblock the blocked core 50 or block the core being read out of. The read-out windings 76 are shown as reversed in successive cores as in the practical embodiment of the circuit. This reversal of the windings is necessary to cancel out noise pulses generated and, accordingly, an output pulse having a positive or negative voltage value will correspond to a binary one, while a signal at ground level represents a binary zero. The double valued signal for a binary one may be handled in a conventional fashion such as rectifying same to produce negative voltage signals representative of a binary one.

Although the recirculating information was described as being delivered to only one of the read buses and the corresponding output registers, it should be appreciated that more than one read core or all of the cores may be placed in the unblocked state whereby the recirculating information will be read out on to each of the read buses corresponding to these cores. Due to the common read buses for each of the cores, information may not be read from more than one delay line at any one time.

Now referring to the writing portion of the circuit of FIG. 5, the function of the write cores 52 will be examined more closely. Assuming that it is desired to write new information into the recirculating pulse train by means of the write core 52 having the horizontal-vertical coordinates of 1—1, the horizontal half-select current will be provided from the decoder 12 in the same fashion as described for the read switches. The other half-select current will be provided by the energization of the write bus select 96 which, in this instance, will select the write bus number one or number two.

Upon placing the write core 52 having the coordinates 1—1 in the unblocked state, the train of voltage signals applied to this core from the delay line number one will be coupled through the small aperture 60 by means of the winding 98, but will not effect the state of the magnetic core 52. If it is desired to write a binary one into the recirculating pulse train, the winding 104 is energized from the positive writing source 100 followed by the energization of the winding 106 from the negative writing source 102 while, if a binary zero is desired, the windings 104 and 106 are energized in the reverse order. The positive and negative signals alternately provided by the energization of the windings 104 and 106 are combined with the recirculating pulses at the AND circuit 32 and the combination of these signals will control the triggering of the current pulse generator 40, as described hereinabove, to correspondingly provide the binary coded signals for application to the input transducer 22 and the read switches 14 for delay line number one. The generation of the binary ones and zeros from the write cores 52 and their relative polarities at the time of the arrival of the clock pulses from the source 38 at the AND circuits 32 are shown in FIG. 6. A negative pulse representative of the binary one to be written into the pulse train is effective to trigger the current pulse generator 40 while the positive pulse produced by writing in a binary zero does not trigger this oscillator. It should be noted that both write buses one and two may be controlled to write in new information into the same delay line at the same time. Also, the reading and writing of information into a single delay line may occur at the same time. It will also be possible to read and write from and onto one delay line at the same time that another one or more delay lines are being written onto.

After the reading or writing operation is effected by the magnetic cores 50 and 52 respectively, the selected cores must be placed in a non-read or blocked magnetic state to allow a subsequent reading or writing operation to take place. The non-read state is effected by applying a blocking current to the respective windings 62 and 86 for the read and write cores respectively, as described hereinabove in conjunction with FIGS. 3 and 4. The blocking of a write core 50 may occur at any time that is convenient in the particular system in which the invention is incorporated. The blocking of a write core, however, must occur at a predetermined time whereby no spurious noise signals may be generated. The blocking of the write cores must occur between the clock pulse signals from the source 38 that cause the triggering of the current pulse generator 40. If the blocking of the write cores occurred during these clock pulse intervals, they could cause a false input to the delay lines and erroneous information. The energization of the blocking windings for both the read and write cores may then be arrangtd to occur at the time interval dictated by the write cores, as shown in the diagram of FIG. 6.

Although the invention has been described in terms of the Transfluxor, it should be noted that other static magnetic devices such as the combination of a bistable toroidal core with a movable permanent magnet arranged to selectively block and unblock the magnetic cores may be employed.

It will now be seen that the reading and writing switches provided by this invention advantageously utilize the static chracteristics of magnetic cores so that when they are placed in a read or write state they will remain in this state without the need to resort to holding power as in prior art circuits. It will also be seen that the equipment that set up a read or write switch in an unblocked state at a cross point is not needed to maintain the connection or state so that the set up equipment may be shared by many such cross points. In a practical system utilizing 64 magnetostrictive delay lines in the memory 10, 64 words were stored in each delay line whereby a total of 4,096 words were stored in this fashion. The total recirculation time in each of the delay lines was on the order of three milliseconds, which, if a magnetic drum memory was employed, would correspond to 20,000 r.p.m. The average access time to a word in the memory 10 utilizing the read and write switches of this invention was on the order of 1.5 milliseconds.

What is claimed is:

1. In a computer including a dynamic storage device having spaced apart input and output transducers interconnected in a loop to continually recirculate information in the form of a train of pulses received at the output transducer for re-entry into said input transducer, switching means coupled to said recirculation loop intermediate said output and input transducers for selectively reading out and selectively writing information into said train of pulses, said switching means including at least a single magnetic core for selectively reading out the recirculating train of pulses and at least a single magnetic core for selectively writing information into said train of pulses, each of said magnetic cores having a substantially rectangular hysteresis characteristic and a plurality of apertures for defining first, second, and third legs in said cores to establish a pair of controllable flux paths of substantially different lengths linking said legs, individual input windings separately magnetically coupled to the first leg of the read and write magnetic core to selectively place each of the cores in a blocked and unblocked magnetic condition corresponding to a non-read and non-write and read and write state respectively, means for selectively energizing the input windings to block and unblock the magnetic cores, winding means for coupling the train of pulses derived from said output transducer to said third leg of the writing core and for responding to the flux changes produced in said third leg when the core is in an unblocked condition, winding means coupled to said third leg of said writing core for changing the flux in said third leg during the unblocked magnetic condition thereof for writing in new information in combination with said train of recirculating pulses, means for energizing said last-mentioned winding means, means serially connected with said winding having the train of pulses thereon and responsive thereto for converting said train of pulses including the pulses provided by said write core to a corresponding train of signals, means for coupling the train of signals derived from said last-mentioned means to said input transducer, means for coupling the train of signals to said third leg of said read core for changing the flux therein during the unblocked magnetic condition thereof, and winding means coupled to said third leg of said read core for responding to the flux changes in said third leg during the unblocked condition thereof to read out the received train of pulses.

2. In a computer as defined in claim 1 wherein said dynamic storage device is a delay line.

3. In a computer including a dynamic storage device having spaced apart input and output transducers interconnected in a loop to continually recirculate information in the form of a train of pulses received at the output transducer for re-entry into said input transducer, switching means coupled to said recirculation loop intermediate said output and input transducers for selectively reading out and selectively writing new information into said storage device, said switching means including a plurality of magnetic cores for selectively reading out the recirculating train of pulses to a plurality of registers and a plurality of magnetic cores for selectively writing information from a plurality of sources into said train of pulses, each of said magnetic cores having a substantially rectangular hysteresis characteristic and a plurality of apertures for defining first, second, and third legs in said cores to establish a pair of controllable flux paths of substantially different lengths linking said legs, individual input windings separately magnetically coupled to the first leg of the read and write magnetic core to selectively place the cores in a blocked and unblocked magnetic condition corresponding to a non-read and non-write and read and write state respectively, means for selectively energizing the input windings to block and unblock the magnetic cores, means for coupling the train of pulses derived from said output transducer to said third leg of each of the writing cores in series circuit relationship and for responding to the flux changes produced in said third leg when either core is in an unblocked condition, winding means coupled to said third leg of said writing core for changing the flux in said third leg during the unblocked magnetic condition thereof for writing in new information in combination with said train of recirculating pulses, means for energizing said last mentioned winding means, the train of pulses derived from said output transducer being voltage signals and thereby ineffective to provide a change in the magnetic condition of the write core, current generating means serially connected with said winding having the train of voltage pulses thereon including the voltage signals provided by said write cores and responsive thereto for converting said train of pulses to a train of current signals having the new information therein, means for coupling the train of current signals derived from said last-mentioned means to said input transducer, means for serially coupling the train of current signals to said third leg of each of said read cores for changing the flux therein during the unblocked magnetic condition thereof, and individual winding means coupled to said third leg of each of said read cores for responding to the flux changes in said third leg during the unblocked condition of each to read out the received train of pulses to separate registers.

4. In a computer as defined in claim 3 wherein said current generating means comprises a current pulse generator and a gating circuit for controllably applying the combination of the train of signals from the output transducer and the write cores to said current pulse generator, and a source of control pulses occurring at preselected intervals related to the time of arrival of the pulses of the train and effective in combination therewith for applying signals to the current pulse generator.

5. A memory including a plurality of delay lines each having separate input means for introducing signals into the lines and output means for deriving the signals from the lines a preselected interval after the signals have been introduced therein, circuit means for each delay line interconnecting the input means and output means of the same delay line for continually reintroducing and recirculating the information derived from the delay line, said circuit means including static magnetic control means individual to each recirculating circuit for reading out the recirculating information and for altering the recirculating information, said magnetic control means being normally arranged to be ineffective for reading or altering the recirculating information applied thereto, means for rendering one of the control means for a single delay line operative at any one time for reading the recirculating information out of one of the delay lines, means for rendering one of the control means for a single delay line operative for altering the recirculating information in the loop, and means for selectively rendering the control means inoperative for read ing out of or writing into a delay line.

6. Storage apparatus comprising a plurality of delay lines each having separate input means for introducing signals into the lines and output means for deriving the signals from the lines a preselected interval after the signals have been introduced therein, circuit means interconnecting the input means and output means of each delay line for continually reintroducing and recirculating the information derived from the same delay line, said circuit means including a plurality of static magnetic reading elements individual to each recirculating circuit for separately reading out the recirculating information and a plurality of static magnetic writing elements for separately writing in new information or altering the recirculating information, said magnetic control means being normally arranged to be ineffective for reading, writing, or altering the recirculating information applied thereto, means for rendering at least one of the reading elements for a single delay line operative for reading the recirculating information out of one of the delay lines, means for rendering one of the writing elements for a single delay line operative for writing information into the recirculation loop, and means for separately and selectively rendering the reading and writing element inoperative.

7. In a computer including a plurality of delay lines each having separate input means for introducing signals into each line and separate output means for deriving the signals from the lines a preselected interval after the signals have been introduced therein, circuit means interconnecting the output and input means of a single delay line for continually recirculating the information derived from the delay line, circuit means for each of said delay lines including at least a single static magnetic core for selectively reading out the recirculating train of pulses and at least a single static magnetic core for selectively writing new information into said train of pulses, each of said magnetic cores having a plurality of stable states corresponding to a blocked and unblocked magnetic condition, means coupled to each of said read cores for substantially simultaneously placing them in a blocked or unblocked magnetic condition, means for actuating said latter-mentioned means, means coupled to each of said write cores for substantially simultaneously placing them in a blocked or unblocked magnetic condition, means for actuating said latter-mentioned means, winding means for coupling the train of pulses derived from said output means of each of said delay lines to the corresponding writing core for said delay line and for responding to the flux changes produced therein, winding means coupled to each of said writing cores in series circuit relationship for changing the flux therein during the unblocked magnetic condition of the write core for writing in new information in combination with said train of recirculating pulses passing therethrough, means for selectively and separately energizing said latter-mentioned winding means for the write core, individual means for each of said devices serially connected with said winding of the write cores having the train of pulses thereon and responsive thereto for converting said train of pulses including the pulses provided by said write core to a corresponding train of signals, means for coupling the train of signals derived from said last-mentioned means to said input means corresponding to the associated output means, and individual means for serially coupling the train of signals to said read core coupled to an input means for each of said devices for changing the flux therein during the unblocked magnetic condition thereof, and individual winding means coupled to said read cores for responding to the flux changes therein during the unblocked condition of the corresponding read core to deliver the received train of pulses to separate registers.

8. In a computer including a plurality of dynamic storage devices each having spaced apart input and output transducers interconnected in a loop to continually recirculate information in the form of a train of pulses received at the output transducer for re-entry into said input transducer for the same device, switching means coupled to said recirculation loop intermediate said output and input transducers for reading out or writing new information into each of said storage devices, said switching means for each of said devices including at least a single magnetic core for selectively reading out the recirculating train of pulses and at least a single magnetic core for selectively writing new information into said train of pulses, each of said magnetic cores having a substantially rectangular hysteresis characteristic and a plurality of apertures for defining first, second, and third legs in said cores to establish a pair of controllable flux paths of substantially different lengths linking said legs, blocking winding means coupled to the first leg of each of said read cores for substantially simultaneously placing them in a blocked magnetic condition, first input winding means serially coupled to at least the second leg of each of said read cores and effective to produce a partial change in the magnetic condition of each of said cores, second input winding means coupled to the first leg of each of said read cores for selectively producing a partial change in the magnetic condition of each of said cores, the energization of said first and second input winding means coupled to the same read core substantially simultaneously only being effective to place a read magnetic core in an unblocked magnetic condition whereby the recirculating train of pulses from the storage device corresponding to said same read core may be read out, blocking winding means coupled to the first leg of each of said write cores for substantially simultaneously placing them in a blocked magnetic condition, third input winding means serially coupled to at least the second leg of each of said write cores and effective to produce a partial change in the magnetic condition of each of said cores, fourth input winding means coupled to the first leg of each of said write cores for selectively producing a partial change in the magnetic condition of each of said cores, the energization of said third and fourth input winding means coupled to the same write core substantially simultaneously only being effective to place a write magnetic core in an unblocked magnetic condition whereby new information may be written into the recirculating train of pulses from the delay line corresponding to said same write core, means for selectively energizing one of said fourth input winding means for said read and write cores of a single delay line storing a preselected information, means for selectively and separately energizing said input winding means for the read and write cores, means for selectively energizing the blocking winding means for said read and write cores, winding means for coupling the train of pulses derived from said output transducer of each of said devices to said third leg of the corresponding writing core for said device and for responding to the flux changes produced in said third leg, winding means coupled to the third legs of each of said writing cores in series circuit relationship for changing the flux in each of said third legs during the unblocked magnetic condition of the write cores for writing in new information in combination with said train of recirculating pulses passing therethrough, means for selectively and separately energizing said separate winding means for the write cores, individual means for each of said devices serially connected with said winding of the write cores having the train of pulses thereon and responsive thereto for converting said train of pulses including the pulses provided by said write core to a corresponding train of signals, means for coupling the train of signals derived from said last-mentioned means to said input transducer of a storage device corresponding to the associated output transducer, individual means for serially coupling the train of signals to said third leg of the read core coupled to an input transducer for each of said devices for changing the flux therein during the unblocked magnetic condition thereof, and read-out winding means coupled to said third leg of each of said read cores for responding to the flux changes in said third leg during the unblocked condition of the corresponding read core to deliver the received train of pulses to separate registers.

9. In a computer including a plurality of delay lines each having spaced apart input and output transducers interconnected in a loop to continually recirculate information in the form of a train of pulses received at the output transducer for re-entry into said input transducer for the same delay line, switching means coupled to said recirculation loop intermediate said output and input transducers for reading out or writing new information into each of said delay lines, said switching means for each of said delay lines including a plurality of magnetic cores for selectively reading out the recirculating train of pulses and a plurality of magnetic cores for selectively writing new information into said train of pulses, each of said magnetic cores having a substantially rectangular hysteresis characteristic and a plurality of apertures for defining first, second, and third legs in said cores to establish a pair of controllable flux paths of substantially different lengths linking said legs, said plurality of read and write cores each being arranged in rows and columns corresponding to an individual delay line whereby information may be read out of a selected delay line to one or a plurality of registers and information written into a selected one or a plurality of delay lines from separate sources, separate blocking winding means serially coupled to the first leg of each of said read cores arranged in the same column for substantially simultaneously placing them in a blocked magnetic condition, separate input winding means serially coupled to at least the second leg of each of said read cores arranged in the same column and effective to produce a partial change in the magnetic condition of each of said cores, separate winding means serially coupled to the first leg of each of said read cores in the same row for selectively producing a partial change in the magnetic condition of each of said cores, the energization of at least one of said separate input winding means and one of said separate winding means substantially simultaneously being effective to place a read magnetic core in an unblocked magnetic condition whereby the recirculating train of pulses from the delay line corresponding to a selected row of read cores may be read out at the unblocked magnetic cores, separate blocking winding means serially coupled to the first leg of each of said write cores arranged in the same column for substantially simultaneously placing them in a blocked magnetic condition, separate input winding means serially coupled to at least the second leg of each of said write cores arranged in the same column and effective to produce a partial change in the magnetic condition of each of said cores, separate winding means coupled to the first leg of each of said write cores in the same row for selectively producing a partial change in the magnetic condition of each of said cores, the energization of said input winding means and one of said separate winding means substantially simultaneously being effective to place a write magnetic core in an unblocked magnetic condition whereby new information may be written into the recirculating train of pulses from the delay line corresponding to a selected row of write cores, means for selectively energizing one of said separate winding means for said read and write cores in a single row, means for selectively and separately energizing the input winding means for the read and write cores arranged in a predetermined column, means for selectively energizing the blocking winding means for said read and write cores, winding means for coupling the train of pulses derived from said output transducer of each of said delay lines to said third leg of each of the corresponding writing cores for said delay line and for responding to the flux changes produced in each of said third legs, separate winding means coupled in series circuit relationship to the third legs of each of said writing cores arranged in the same column for changing the flux in each of said third legs during the unblocked magnetic condition of the write cores for writing new information in combination with said train of recirculating pulses passing therethrough, means for selectively and separately energizing said separate winding means for the write cores, individual means for each of said delay lines serially connected with said winding of the write cores having the train of pulses thereon and responsive thereto for converting said train of pulses including the pulses provided by said write core to a corresponding train of signals, means for coupling the train of signals derived from said last-mentioned means to said input transducer corresponding to the associated output transducer for a delay line, and separate winding means for serially coupling the train of signals to said third legs of the read cores arranged in the same row for each of said delay lines for changing the flux therein during the unblocked magnetic condition thereof, and individual winding means coupled to said third leg of each of said read cores arranged in the same column for responding to the flux changes in said third legs during the unblocked condition of the corresponding read core to deliver the received train of pulses to separate registers.

10. In a computer as defined in claim 9 wherein said delay lines are magnetostrictive delay lines.

11. In a computer as defined in claim 10 wherein the train of pulses derived from the delay line are voltage pulses and said converting means comprises a current generator and a coincidence gating circuit for controllably applying the combination of the train of signals from the output transducer and the write cores to said current generator, and a source of control pulses occurring at preselected intervals related to the time of arrival of the pulses of the train and effective in combination therewith for applying signals to the current generator.

12. A magnetic control switch for selectively connecting signals from a plurality of independent sources to a plurality of separate receivers, said control switch including a plurality of magnetic cores having a substantially rectangular hysteresis characteristic and a plurality of apertures for defining first, second, and third legs in said cores to establish a pair of controllable flux paths of substantially different lengths linking said legs, said plurality of magnetic cores being arranged in rows and columns, blocking winding means serially coupled to the first leg of each of said magnetic cores arranged in the same column for substantially simultaneously placing them in a blocked magnetic condition, means for energizing said blocking winding means, separate input winding means serially coupled to at least the second leg of each of said magnetic cores arranged in the same column and effective to produce a partial change in the magnetic condition of each of said cores, separate winding means serially coupled to the first leg of each of said magnetic cores in the same row for producing a partial change in the magnetic condition of each of said cores, the energization of said input winding means and at least one of said separate winding means substantially simultaneously only being effective to place the magnetic core in an unblocked magnetic condition, means for selectively energizing one of said separate winding means for said magnetic cores in a single row, means for selectively and separately energizing the input winding means for the magnetic cores arranged in the same column, a plurality of information sources corresponding to the plurality of rows of magnetic cores, separate winding means for serially coupling the information signals from each of said sources for an individual row to said third legs of the magnetic cores arranged in the same row for producing a flux change therein when at least one magnetic core is in the unblocked magnetic condition, individual read-out winding means coupled to said third leg of each of said cores arranged in the same column for responding to the flux changes in said third legs during the unblocked condition of the corresponding magnetic core to deliver the information signals to separate registers, and a plurality of registers corresponding to the plurality of columns of magnetic cores and separately coupled to the individual read-out winding means for each column to receive the signals from the selected source by means of the read-out winding means for the unblocked magnetic core.

13. A magnetic control switch including a plurality of magnetic cores adapted to be placed in a blocked magnetic state to prevent the transmission of signals applied thereto or an unblocked magnetic state to transmit signals applied thereto, said plurality of magnetic cores being arranged in rows and columns, means coupled to said magnetic cores arranged in the same column for substantially simultaneously placing them in a blocked magnetic condition, means for actuating said latter-mentioned means, means coupled to said magnetic cores in the same column for partially unblocking the magnetic cores, means coupled to said magnetic cores in the same row for partially unblocking the magnetic cores, means for selectively and simultaneously energizing said latter pair of means to completely unblock at least one of said cores, a plurality of information sources corresponding to the plurality of rows of magnetic cores, separate winding means for serially coupling the information signals from each of said sources for an individual row to said magnetic cores arranged in the same row for producing a flux change therein when at least one magnetic core is in the unblocked magnetic condition, individual winding means coupled to each of said cores arranged in the same column for responding to the flux changes therein during the unblocked condition of the corresponding magnetic core to deliver the information signals to separate registers, and a plurality of registers corresponding to the plurality of columns of magnetic cores and separately coupled to the individual winding means for each column to receive the signals from the selected source by means of the unblocked magnetic core.

14. A magnetic control switch for selectively connecting signals from a plurality of independent sources to a plurality of separate receivers as defined in claim 12 including writing winding means coupled to each of said magnetic cores in the same column to produce a change in the third legs of said cores substantially simultaneously with the arrival of the information signals from said sources to modify the information as it travels from a source to a register by means of the unblocked magnetic core and another plurality of sources corresponding to the number of columns each coupled to one of said writing means.

15. A magnetic control switch for selectively connecting signals from a plurality of independent sources to a plurality of separate receivers as defined in claim 14 wherein said first mentioned source of signals provides voltage signals for combination with the current signals generated by said another plurality of sources.

16. A magnetic control switch for selectively connecting signals from a plurality of independent sources to a plurality of separate receivers, said control switch including a plurality of magnetic cores having a substantially rectangular hysteresis characteristic and a plurality of apertures for defining first, second, and third legs in said cores to establish a pair of controllable flux paths of substantially different lengths linking said legs, said plurality of magnetic cores being arranged in rows and columns, blocking winding means serially coupled to the first leg of each of said magnetic cores arranged in the same column for substantially simultaneously placing them in a blocked magnetic condition, means for energizing said blocking winding means, partial unblocking winding means coupled to said magnetic cores in the same column for tending to place the magnetic condition of said second and third legs in opposite conditions, partial unblocking winding means coupled to said magnetic cores in the same rows for tending to place the magnetic condition of said second and third legs in opposite conditions, the energization of both of said partial unblocking winding means substantially simultaneously only being effective to place a magnetic core in an unblocked magnetic condition, means for selectively energizing one of said partial unblocking winding means for said magnetic cores in a single row, means for selectively energizing at least one of the partial unblocking winding means for the magnetic cores arranged in the same column, a plurality of information sources corresponding to the plurality of rows of magnetic cores, separate winding means for serially coupling the information signals from each of said sources for an individual row to said third legs of the magnetic cores arranged in the same row for producing a flux change therein when at least one magnetic core is in the unblocked magnetic condition, individual read-out winding means coupled to said third leg of each of said cores arranged in the same column for responding to the flux changes in said third legs during the unblocked condition of the corresponding magnetic core to deliver the information signals to separate registers, and a plurality of registers corresponding to the plurality of columns of magnetic cores and separately coupled to the individual read-out winding means for each column to receive the signals from the selected source by means of the unblocked magnetic core.

References Cited in the file of this patent

UNITED STATES PATENTS

| | | |
|---|---|---|
| 2,770,797 | Hamilton et al. | Nov. 13, 1956 |
| 2,869,112 | Hunter | Jan. 13, 1959 |
| 2,937,285 | Olsen | May 17, 1960 |

OTHER REFERENCES

Proceedings of a Symposium, National Physics Laboratory, March 25, 1953. "Applications of Magnetostriction Delay Lines," by R. C. Robbins and R. Millership, pages 199 to 209.